United States Patent [19]

Iizawa et al.

[11] Patent Number: 5,353,401

[45] Date of Patent: Oct. 4, 1994

[54] AUTOMATIC INTERFACE LAYOUT GENERATOR FOR DATABASE SYSTEMS

[75] Inventors: Atsushi Iizawa, Tokyo; Yukari Shirota, Saitama, both of Japan; Arturo Pizano, Milpitas, Calif.

[73] Assignees: Ricoh Company, Ltd., Japan; Ricoh Corporation, San Jose, Calif.

[21] Appl. No.: 973,057

[22] Filed: Nov. 6, 1992

[51] Int. Cl.$^5$ .............................................. G06F 15/62
[52] U.S. Cl. .................................... 395/161; 395/155; 395/921
[58] Field of Search ............... 395/155, 161, 921, 156, 395/159

[56] References Cited

U.S. PATENT DOCUMENTS

| | | | |
|---|---|---|---|
| 4,275,449 | 6/1981 | Aish | 364/512 |
| 4,495,559 | 1/1985 | Gelatt, Jr. et al. | 364/148 |
| 4,700,317 | 10/1987 | Watanabe et al. | 395/51 |
| 4,755,955 | 7/1988 | Kimura et al. | 395/148 |
| 4,831,546 | 5/1989 | Mitsuta et al. | 364/512 |
| 4,908,772 | 3/1990 | Chi | 364/512 |
| 4,965,741 | 10/1990 | Winchell et al. | 395/12 |
| 5,091,868 | 2/1992 | Pickens et al. | 395/148 |
| 5,191,542 | 3/1993 | Murofushi | 364/491 |
| 5,206,815 | 4/1993 | Purcell | 364/491 |
| 5,214,755 | 5/1993 | Mason | 395/147 |

OTHER PUBLICATIONS

De Lange et al., "A Hierarchical Graph Oriented Compaction System for Symbolic Layout", 1989 IEEE International Symposium on Circuits and Systems (1989), pp. 57–60.

Foley et al., "Vide-An Intelligent User Interface Design Environment," Intelligent Interfaces Conference (Apr. 1988), pp. 339–385.

Foley et al., "Defining Interfaces at a High Level of Abstraction", IEEE Software (Jan. 1989), pp. 25–32.

Myers, "User-Interface Tools: Introduction and Survey", IEEE Software (Jan. 1989), pp. 15–23.

Rutenbar, "Simulated Annealing Algorithms: An Overview", IEEE Circuits and Devices Magazine, vol. 5, No. 1 (Jan. 1989) pp. 19–26.

Hsieh et al., "Two-Dimensional Layout Compaction by Simulated Annealing," 1988 IEEE International Symposium on Circuits and Systems (Jun. 1988), pp. 2439–2443.

"A Programming Language Basis for User Interface Management"; D. R. Olsen Jr.; 1989; ACM 0-897-91-301-9/89/0004-0171/May 1989; pp. 171–175.

"Scope: Automated Generation of Graphical Interfaces"; C. M. Beshers et al.; 1989 ACM 0-89791-33-5-3/89/0011/0076; Nov. 1989; pp. 76–85.

"Chisel: A System for Creating Highly Interactive Screen Layouts"; G. Singh et al.; 1989 ACM 0-897-91-335-3/89/0011/0086; Nov. 1989; pp. 86–94.

"DON: User Interface Presentation Design Assistant"; W. C. Kim et al.; 1990 ACM 089791-41-0-4/90/0010/0010; pp. 10–20.

"Template-Based Mapping of Application Data to Interactive Displays"; P. Szekely; 1990 ACM 089791-41-0-4/90/0010/0001; pp. 1–9.

"VLSI Cell Placement Techniques"; K. Shahookar et al., ACM Computing Surveys, vol. 23, No. 2, Jun. 1991; pp. 143–185.

*Primary Examiner*—Heather R. Herndon
*Assistant Examiner*—N. Kenneth Burraston
*Attorney, Agent, or Firm*—Flehr, Hohbach, Test, Albritton & Herbert

[57] ABSTRACT

An automatic interface layout generator for database systems is disclosed herein. The automatic generator includes a specification tool for specifying a set of block descriptions representative of specified portions of a database. A block layout generator produces interface objects to be included within an interface of the database, wherein each of the interface objects corresponds to one of the block descriptions and includes a plurality of layout fields. A layout quality parameter is determined for each of the interface objects based on arrangement of the layout fields within the interface objects. A block placement generator arranges sets of the interface objects into block configurations within the interface. A placement quality parameter for each of the block configurations is derived based on a set of block placement rules and on the layout quality parameters, and a final block configuration is selected by comparing the placement quality parameters corresponding to particular block configurations.

13 Claims, 12 Drawing Sheets

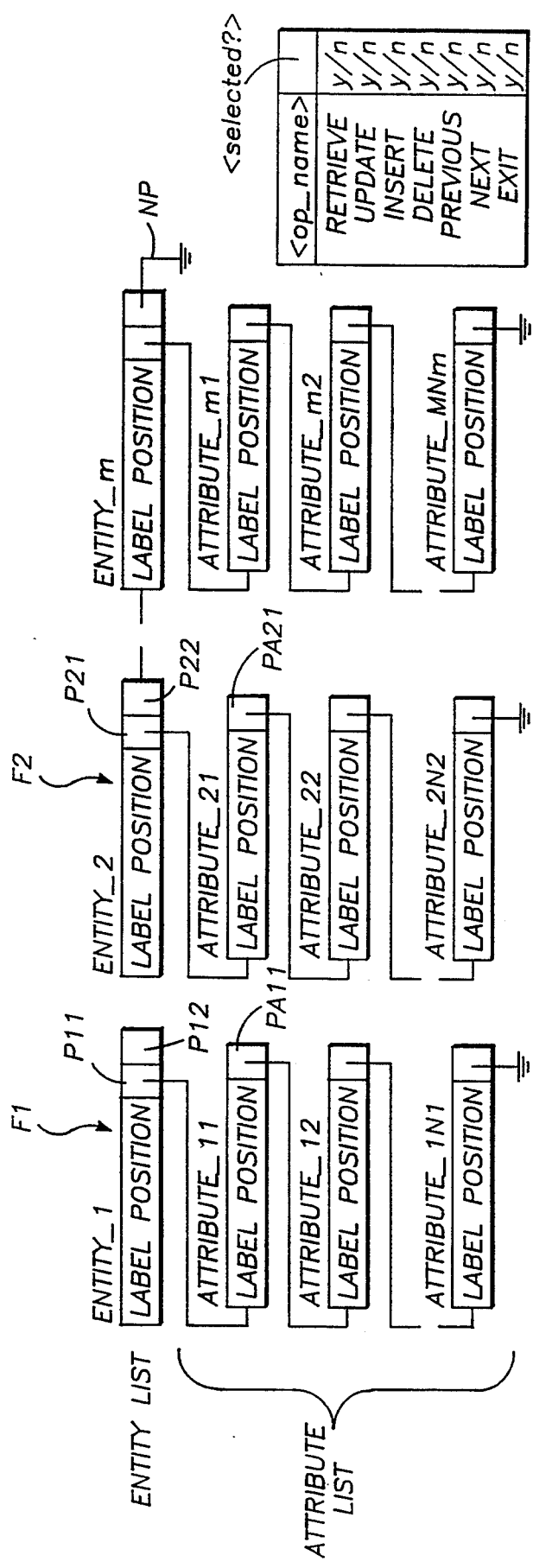
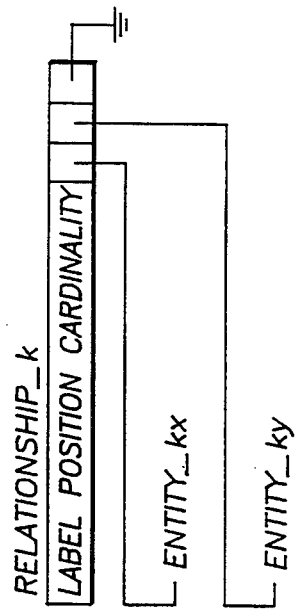
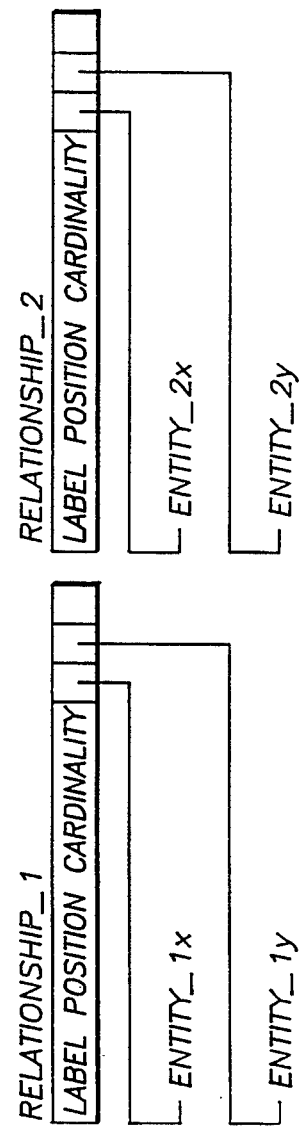
FIG.-4A
FIG.-5
FIG.-4B

```
LAYOUT PLAN

/*LOCAL ATTRIBUTES*/  /* LAYOUT USING COLUMN_SPLIT({1,2,3}) */

FONT SIZE = 12;
FONT STYLE = PLAIN;
UPPER MARGIN = 12;
LOWER MARGIN = 12;
LEFT MARGIN = 10;
RIGHT MARGIN = 10;
FIELD SEPARATION = 2;
FIELD LABEL SEPARATION = 4;
```

FIG.—9A

```
/*REPRESENTATION SECTION*/
OBJECT:NAME;      WIDGET:TEXT;
OBJECT:AGE;       WIDGET:TEXT;
OBJECT:STREET;    WIDGET:TEXT;
OBJECT:CITY;      WIDGET:TEXT;
OBJECT:ZIP;       WIDGET:TEXT;
OBJECT:COMMENTS;  WIDGET:LONG TEXT;
OBJECT:PHOTO;     WIDGET:IMAGE BUTTON;
```

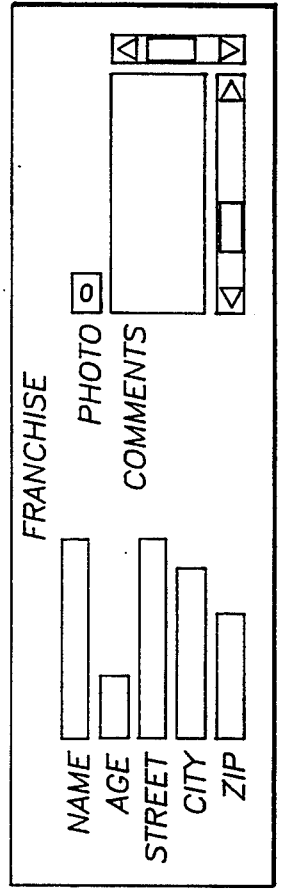

FIG.—9B

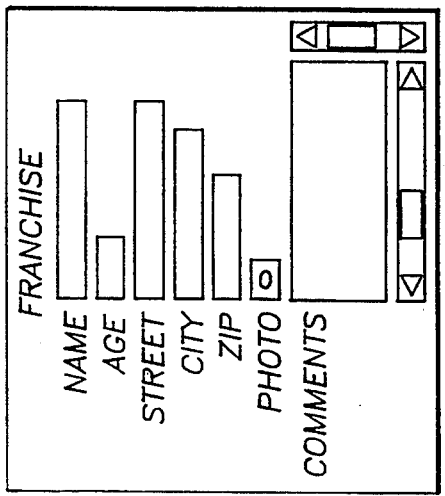

FIG.—9C

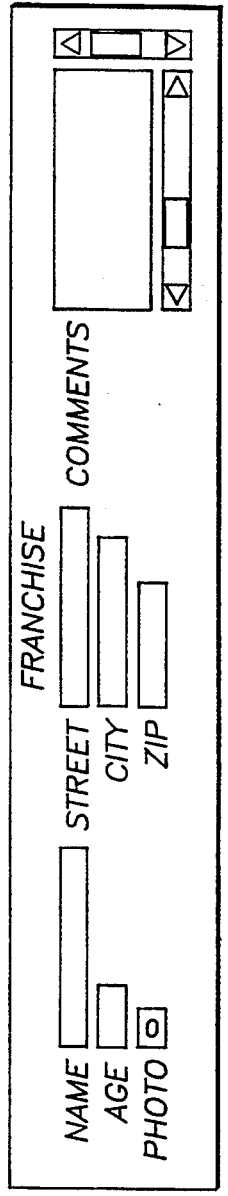

FIG.—9D

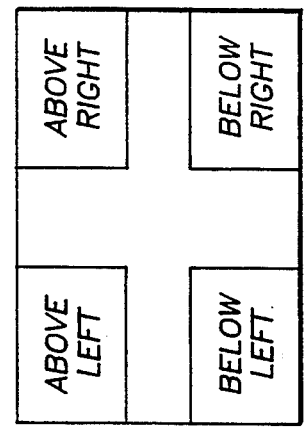
FIG.-10
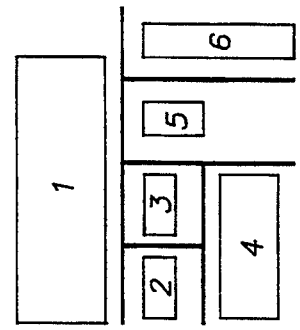
FIG.-11C
FIG.-11B
FIG.-11A
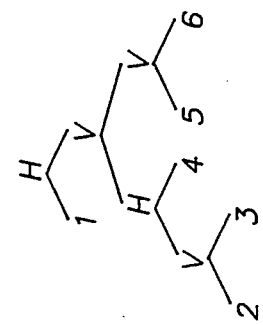

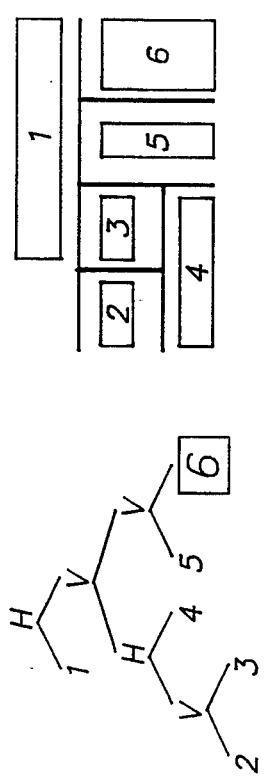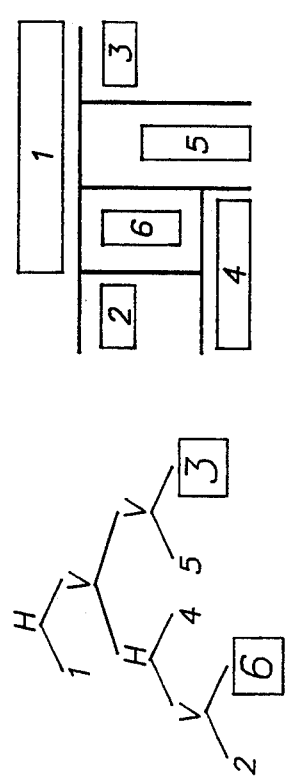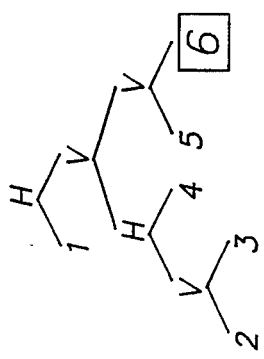
FIG.-13B  FIG.-14B  FIG.-15B
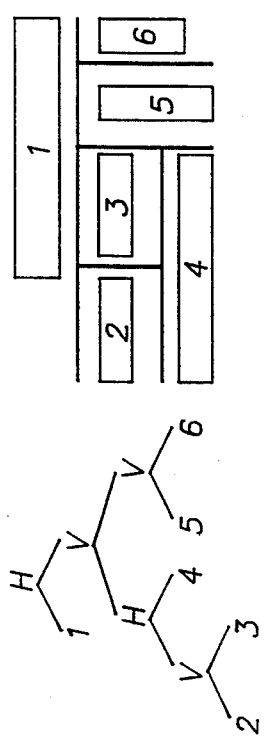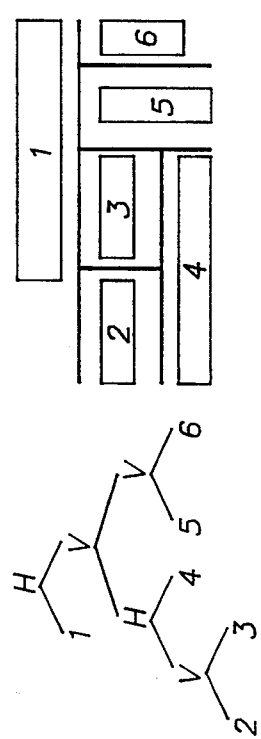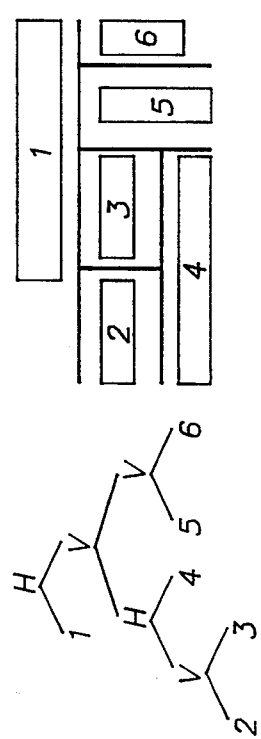
FIG.-13A  FIG.-14A  FIG.-15A

AUTOMATIC INTERFACE LAYOUT GENERATOR FOR DATABASE SYSTEMS

The present invention relates generally to layout planning systems for interface displays, and particularly to automatic methods and systems for generating user interface layouts.

BACKGROUND OF THE INVENTION

As is well known, computer programs have become easier to use as a consequence of the development of graphical user interfaces. The proliferation in the number of applications programs with graphical user interfaces is partly the result of the advent of windowed user environments (e.g., Microsoft Windows). Unfortunately, the creation of a graphical user interface generally requires the utilization of user interface "toolkits" by highly-skilled programmers. While user interface toolkits enable a programmer to specify the manner in which a particular data structure is displayed, such toolkits do not address the task of designing the entire interface. Instead, design of the overall interface generally requires an application programmer to:

(1) become knowledgeable about the toolkit and its virtual devices,
(2) select appropriate virtual devices based on the input and output requirements of the application,
(3) customize the devices for the particular application,
(4) lay out the selected devices on the interface display, and
(5) write code which initiates the interface and integrate it with the application.

Although this creates an interface for an existing application, changing the application typically requires corresponding changes to be made to the interface. It follows that parallel development of an application and its interface requires repeated and costly revisions. Hence, increased interest has developed in the development of tools to automate the design of graphical user interfaces.

In the field of database applications there exist several types of tools used to facilitate the design of user interfaces. Among these are included stand-alone form managers, fourth generation languages, graphical user interface builders, automatic graphical user interface generation systems, and automatic layout designers.

Stand-Alone Form Managers

Commercially available stand-alone form managers (e.g., INGRES/QBF by Ask Computer Systems Inc., INFORMIX/PERFORM by INFORMIX Software Inc., and ORACLE/SQL*FORMS by ORACLE Corp.) enable the generation of complete database applications with a minimum programming effort. Developers design the layout of the application screens with a graphics editor, then link the fields in the display with their database counterparts using an interactive mechanism or a simple script language. This mode of interaction grants the user access to the database through screen layouts resembling business forms. Although form managers shorten development through automatic generation of database calls, these were originally intended to be used in devices with limited graphical capabilities (e.g., ASCII terminals). Hence, form managers are incapable of taking advantage of graphical user environments.

A further disadvantage of stand-alone form generators is that the creation of sophisticated applications typically requires the use of script languages, which are often unfamiliar to inexperienced users. Moreover, stand-alone form generators require the application developer to customize the interface for each application and for each environment in which it is to run.

Fourth Generation Languages

Fourth generation languages combine the screen layout facilities of a form manager with a programming language that supports database calls, controls the interaction between the user and the application interface, and allows general purpose computations. Fourth generation languages (e.g., INGRES/4GL by Ask Computer Systems Inc., and INFORMIX/4GL by INFORMIX Software Inc.) remove some of the limitations exhibited by stand-alone form managers by enabling applications developers to add specialized code. An editor is still used to design the layout of the interface, but code must be provided to control the flow of data between the interface display, i.e., computer screen, and the database. Fourth generation languages are advantageous in that a portion of the dialog control code is generated automatically, and in that modification may be made to the layout of the interface without rewriting code.

Like stand-alone form managers, fourth generation language systems lack graphical interface capability except when combined with graphical user interface builder routines. Moreover, fourth generation languages generally require that more detailed programming be performed than with stand-alone form managers.

Graphical User Interface (GUI) Builders

A series of user interface management systems (UIMS) and interactive design tools (IDTs) have recently been developed. These development aids, commonly referred to as graphical user interface (GUI) Builders, can be used in conjunction with fourth generation languages to produce application programs having relatively sophisticated user interfaces. GUI Builders allow for more flexibility in interface design than do form managers, since users may interact with the database in a manner not dictated by the style of a typical business form.

GUI Builders generally include several visual design tools, including a What-You-See-Is-What-You-Get (WYSIWYG) Editor, which enable:

(1) interactive selection and placement of the graphical objects (defined by blocks of code known as "widgets") comprising the interface, and
(2) assignment of values to various attributes, e.g., size, color and font type, of each graphical object.

In addition, UIMS also allow for the selection of callback functions, the attachment of user-defined code, and the generation of code used to realize the interface screen display.

Unfortunately, the format of interfaces designed using GUI Builders depends exclusively upon knowledge possessed by the application developer. That is, information relating to desirable design practice is not embedded within GUI Builders. It follows that the quality and consistency of interface layouts produced using GUI Builders will vary considerably.

Automatic GUI Generation Systems

Recent research has yielded several systems capable of automatically generating application programs having graphical user interfaces. These systems use high-level descriptions of the behavior and appearance of data objects included within the application program to produce either an executable program, or source code which is to be edited and refined by the developer prior to generation of the program.

Since the automatic GUI systems listed above have been developed for general-purpose applications, such systems tend to be incapable of utilizing information specific to particular applications. For example, in database applications such information would include parameters stored within a database dictionary. As a consequence, the code produced by automatic GUI systems generally must be edited so as to be in conformance with the requirements of specific applications. Alternatively, a detailed specification of the database structure could be provided to the automatic system.

Automatic Layout Generators

These systems employ methodology from expert systems in order to determine an appropriate arrangement for the group of objects represented in the interface. Automatic layout generators are used to automate the portion of the interface design process associated with positioning each interface object, but are generally not utilized in other aspects of interface design. One example of this type of system is disclosed in U.S. Pat. No. 4,700,317 entitled AUTOMATIC LAYOUT PLANNER AND METHOD FOR AUTOMATICALLY CREATING A LAYOUT PLAN, issued Oct. 13, 1987.

OBJECTS OF THE INVENTION

It is an object of the present invention to provide an interface layout generator capable of producing interfaces, particularly interfaces for database applications, in a manner which requiring minimal user specification.

It is a further object of the present invention to integrate information stored within a database dictionary with expert knowledge relating to user interface design into predefined design criteria utilized during generation of such interfaces.

SUMMARY OF THE INVENTION

In summary, the present invention is an automatic interface layout generator for database systems. The automatic generator includes a specification tool for specifying a set of block descriptions representative of specified portions of a database. A block layout generator produces interface objects to be included within an interface of the database, wherein each of the interface objects corresponds to one of the block descriptions and includes a plurality of layout fields. A layout quality parameter is determined for each of the interface objects based on arrangement of the layout fields within the interface objects. A block placement generator arranges sets of the interface objects into block configurations within the interface. A placement quality parameter for each of the block configurations is derived based on a set of block placement rules and on the layout quality parameters, and a final block configuration is selected by comparing the placement quality parameters corresponding to particular block configurations.

BRIEF DESCRIPTION OF THE DRAWINGS

Additional objects and features of the invention will be more readily apparent from the following detailed description and appended claims when taken in conjunction with the drawings, in which:

FIG. 4 provides a generalized representation of a data structure within a primary memory representative of the database schema of FIGS. 2 and 3.

FIG. 5 shows one example of a data structure in the form of an Operations Table which may be employed to represent the status of the operations panel.

FIG. 9A shows an example of a template which, together with a block description file, are utilized by the block layout generator to produce a set of three object blocks depicted in FIGS. 9B-9D.

FIG. 10 depicts a set of object blocks created by the block layout generator of the present invention.

FIG. 11A is a sliced tree representation of a set of object blocks included within a block configuration shown in FIG. 11B.

FIG. 11C depicts a set of acceptable justifications of an object block relative to a rectangle defined by horizontal and vertical cuts of the type shown in FIG. 11B.

FIGS. 13A and 13B depict changes occurring to a block configuration as a consequence of execution of a Replace operation performed during a simulated annealing block placement procedure.

FIGS. 14A-B depict the effects on a block configuration resulting from a Swap operation.

FIGS. 15A-B depict the effects on a block configuration due to a Move operation.

DESCRIPTION OF THE PREFERRED EMBODIMENT

Introduction

Figure 1:
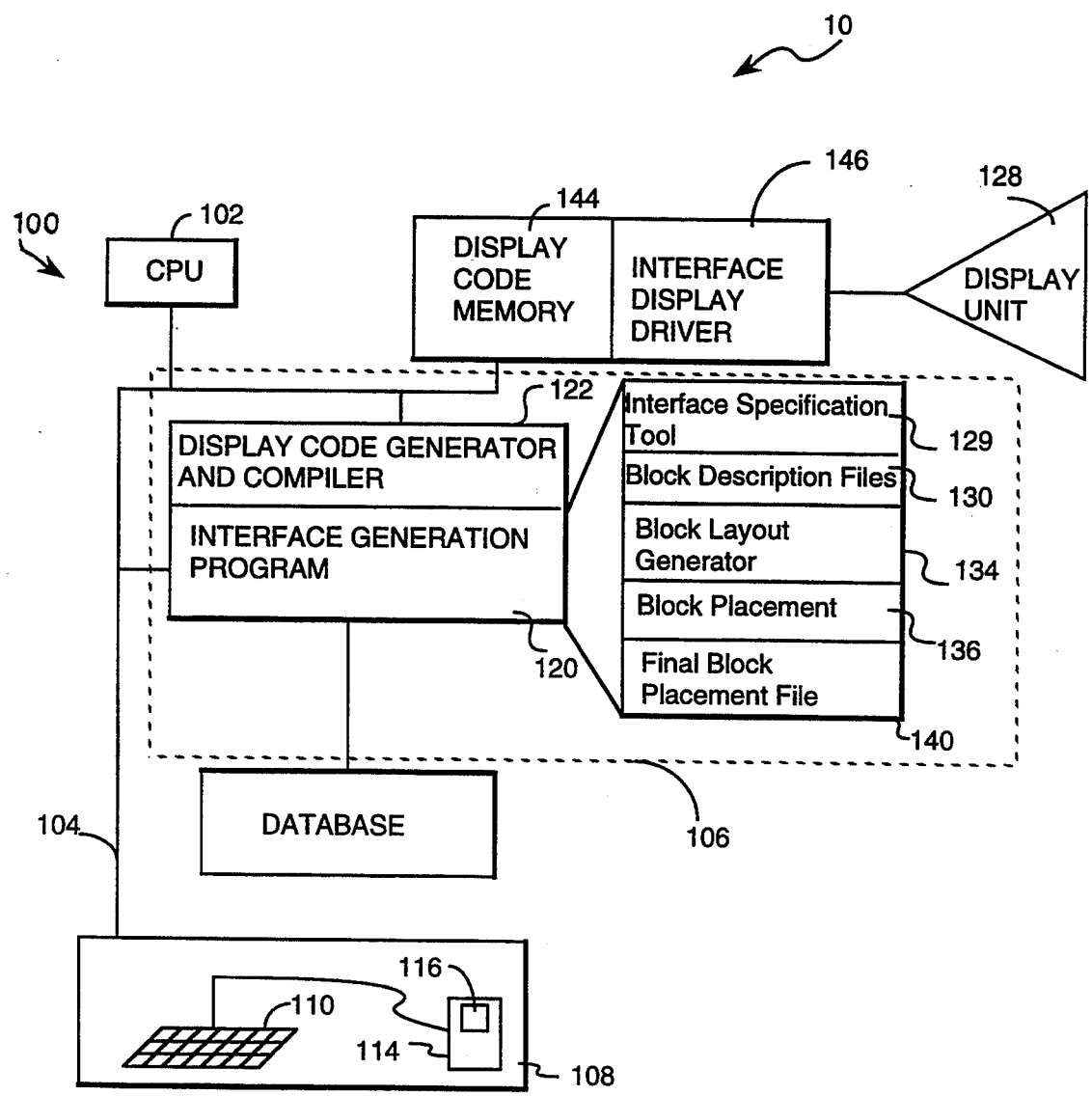
FIG. 1 is a block diagram of a preferred embodiment of the inventive automatic interface layout generator for database systems.

Referring to FIG. 1, there is shown a block diagram of a preferred embodiment of the inventive automatic interface layout generator 10 for database systems. The automatic layout generator 10 of the present invention includes a general purpose computer system 100 having a central processing unit 102 that is interconnected by a system bus 104 to primary memory 106 (i.e., high speed, random access memory), to secondary memory 107, and to one or more input units 108. Each input unit 108 typically includes a keyboard 110, and a mouse pointer device 114 with item selection button 116. Stored in primary memory 106 are an interface generation program 120, as well as a display code generator and compiler 122. As is described hereinafter, the interface generation program 120 is operative to automatically design a user interface for a database stored in secondary memory 104 when appropriate instructions are received from a user via input unit 108. In particular, a diagram representative of the database resident in memory 104 is initially displayed on a display unit 128 using information included within the dictionary of the database and standard graphic layout techniques. An interface specification software tool 129 allows the user, i.e., the interface designer, to select portions of the database structure of interest. This selection is accomplished through a series of point and click operations using pointer device 114 in which the user removes from the database diagram those entities, entity attributes and entity relationships not intended to be represented within the user interface. An interpreter module (not shown) creates a block description file 130 for each entity and relationship included within the database structure selected using the interface specification tool 129.

The interface generation program 120 includes a block layout generator 134 for synthesizing a set of graphical object blocks of varying geometry for each of the entities defined within the block description files 130. A block placement routine 136 is used to determine a preferred placement of object blocks within the user interface in accordance with a combinatorial optimization routine. In this routine the quality of the user interface resulting from various combinations of object blocks is evaluated based on predefined criteria, wherein each combination includes one object block corresponding to each block description file 130. The block combination of highest quality is stored within a final block placement file 140. Referring to FIG. 1, code generator 122 then generates display code based on the user interface design defined by the final block placement file 140. This code is stored in display code memory 144, and is accessed by an interface display driver 146 during display of the user interface via display unit 128.

Detailed Description

As mentioned above, the interface specification tool 129 enables the interface designer to specify which portions of the database stored in secondary memory 104 are to be represented in the user interface created by the interface generation program 120. The interface specification tool 129 is an interactive mechanism which provides an interpreter module with the information necessary to synthesize the block description files 130. The following description of the interface specification tool 129 is intended to describe one manner in which a database structure for which an interface is to be generated may be specified. At the conclusion of this database specification process the block description files 130 are created by the interpreter. It is understood, however, that such block description files may be created by the direct entry of information relating to the structure of the portion of a database for which an interface is to be designed.

In a preferred implementation the interface specification tool 129 is coded in a standard programming language (e.g., C or C++) and includes the following database selection devices: (i) a schema editor, (ii) an operations panel, and (iii) a control panel. In addition, the specification tool 129 includes an interpreter module for defining the portion of the database selected using the database selection devices in terms of block description files 130.

Figures 2, 3:
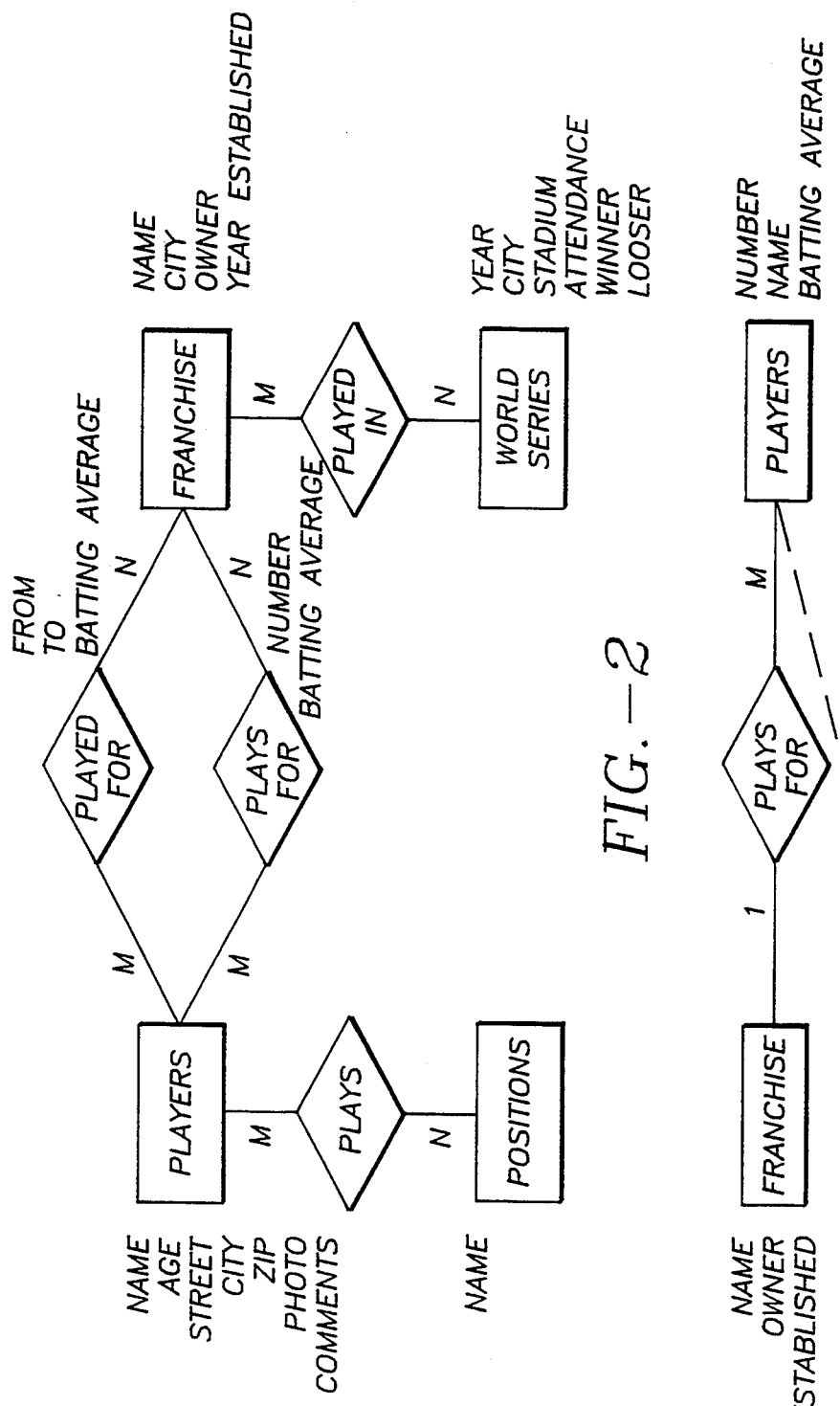
FIG. 2 depicts an example of a display of a database schema.
FIG. 3 depicts a database schema produced by editing the schema shown in FIG. 2 using a schema editor.

FIG. 2 depicts one manner in which the schema representative of a database containing statistics relating to the performance of professional baseball players could be displayed using standard graphics software. The schema shown in FIG. 2 is derived from information stored within dictionary of the database, and allows the interface designer to select objects representative of entities of interest (e.g., FRANCHISE, PLAYERS and POSITION). Through a series of point and click operations the interface designer can instruct the schema editor to convert the representation of FIG. 2 to that of FIG. 3. As shown in FIG. 3, the entity WORLD SERIES has been removed from the database schema of FIG. 2. In addition, certain entity attributes (e.g., City of FRANCHISE) and entity relationships (e.g., "played for" between PLAYERS and FRANCHISE) have been pared from the display of FIG. 2 using the schema editor in order to produce the representation of FIG. 3.

The schema editor may also be used to modify the labeling of database entities and to define master/slave relationships therebetween. Labeling is used to replace existing entity names with more descriptive strings. For example, the name of the FRANCHISE entity could be changed to PREVIOUS_TEAMS concurrent with selection of the "played for" relationship between PLAYERS and FRANCHISE.

Specification of master/slave relationships are intended to resolve ambiguities which may be present when a query retrieves multiple records from a pair of entities. For example, such ambiguity is present when multiple records are retrieved from the entities PLAYERS and FRANCHISE since each of the M entries within PLAYERS can only be associated with one of the N entries within FRANCHISE. Referring to FIG. 3, this ambiguity is resolved by changing the cardinality of the "plays for" relationship between entities PLAYERS and FRANCHISE from M:N to M:1. In this way only the entries in PLAYERS associated with the specified FRANCHISE will be retrieved when a queries are directed to these entities.

FIG. 4 provides a generalized representation of a data structure within primary memory 106 representative of the database schema of FIGS. 2 and 3. As shown in FIG. 4, information pertaining to a plurality of entities, i.e., Entity_1, Entity_2, . . . , Entity_m, is stored in an Entity List. Specifically, stored within a data field F1 corresponding to Entity_1 is a string value indicative of the name of the entity, and a numerical values specifying the position within the database schema of the object representing the entity. Also included in field F1 is numerical pointer P11 corresponding to the memory location of the field associated with the first attribute, i.e., Attribute_11, of Entity_1. Similarly, the value of numerical pointer P12 indicates the location of data field F2 associated with Entity_2. A null pointer NP indicates the end of the Entity List.

An Attribute List includes sets of data fields corresponding to the attributes of each entity within the Entity List. For example, if Entity_1 corresponds to the PLAYERS entity within the database schema of FIG. 2, then Attribute_11 would refer to Name, Attribute_12 to Age, and so on. The value of the pointer PA11 included within the field of Attribute_11 is indicative of the memory location of Attribute_12.

As shown in FIG. 4, a Relationship List includes a plurality of linked data fields defining the relationship between entities displayed via the schema editor. As in the case of entities, each relationship may have associated therewith a set of attributes defined within a Relationship Attribute List. If the database schema of FIG. 2 is used as an example, the data field Relationship_1 could be used to define the "played for" relationship between PLAYERS and FRANCHISE. The Label and Position values within Relationship_1 specify the location of the "played for" text within FIG. 2, while the Cardinality value of M:N indicates the ratio of the number entries within FIELDS and FRANCHISE.

The schema editor facilitates selection of the entity relationships depicted in FIG. 3 by modifying the entries within the data structure of FIG. 4 on the basis of information provided by the interface designer. For example, assume that in FIG. 2 that the entity FRANCHISE corresponds to Entity_2 (FIG. 4). Upon deletion of the "City" attribute associated with FRANCHISE (FIG. 2) using a point and click operation, the schema editor would change the value of the pointer PA21 of Attribute_21 so as to reflect the memory location of Attribute_23.

The interface specification tool 129 will also preferably include an operations panel in which graphical icons in the form of "buttons" or the like representative of common database operations are made available to the interface designer during the database specification process. Included among these common operations are RETRIEVE, UPDATE, INSERT, DELETE, PREVIOUS, NEXT, and EXIT. The icons representative of these operations can be toggled by the interface designer using a series of point and click operations in order to select/deselect particular operations. FIG. 5 shows one example of a data structure in the form of an Operations Table which may be employed to represent the status of the operations panel. The specification tool 129 considers all operations to be selected by default, and imposes the following constraints upon the chosen set of operations:

(1) EXIT cannot be deselected,
(2) if DELETE is selected, then RETRIEVE must also be selected, and
(3) if UPDATE is selected, then RETRIEVE must also be selected.

In a preferred implementation of the specification tool 129 an icon-based control panel is provided through which the interface designer may initiate particular specification functions. Included among the functions which may be selected from the control panel via the user input 108 are:

NEW: Allocates memory for the specification of a new database structure. Upon selection of this option the user is presented with a dialog box in which the name of the database structure for which an interface is to be generated is requested.

OPEN: Loads a previously created database specification. The selection of this operation will trigger the display of a dialog box listing characteristics of the specified database.

CLOSE: Closes the file containing the current database specification. The specification tool 129 remains active.

SAVE: Saves the current database specification.

SAVE AS: Saves the current database specification under a different name.

INTERPRET: Selection of this function signals the interpreter module to commence generation of the block description files corresponding to the current database specification (see below).

EXIT: Ends execution of the interface specification tool 129. Following standard practice, the system will ask for confirmation if the current application specification has not been saved since the most recent change.

As mentioned above, the purpose of the interpreter module is to convert the database specification created using the specification tool 129 into the block description files (BDFs) 130 processed by the block layout generator 134 (FIG. 1). There exist three types of BDFs:

(1) menu BDFs, containing a list of the operations requested using the specification tool 129;
(2) data BDFs, where each data BDF contains information pertaining to one of the entities included in the database structure specified using the specification tool 129; and
(3) relationship BDFs, where each relationship BDF contains information pertaining to one of the relationships between entities specified using the specification tool 129 (e.g., the "played for" relationship of FIG. 2).

The BDFs are structured in the following manner:

| Menu BDF |
| --- |
| <operation 1> |
| <operation 2> |
| . |
| . |
| <operation N> |
| Data BDF |
| <entity_name> |
| <field_name_1>  <type>  <width>  <height>  <label> |
| <field_name_2>  <type>  <width>  <height>  <label> |
| ... |
| <field_name_M>  <type>  <width>  <height>  <label> |
| Relationship BDF |
| <relationship_name> |
| <label>  <width>  <height>  <cardinality> |
| <field_name_1>  <type>  <width>  <height>  <label> |
| <field_name_2>  <type>  <width>  <height>  <label> |
| ... |
| <field_name_P>  <type>  <width>  <height>  <label> |

Figure 6A:
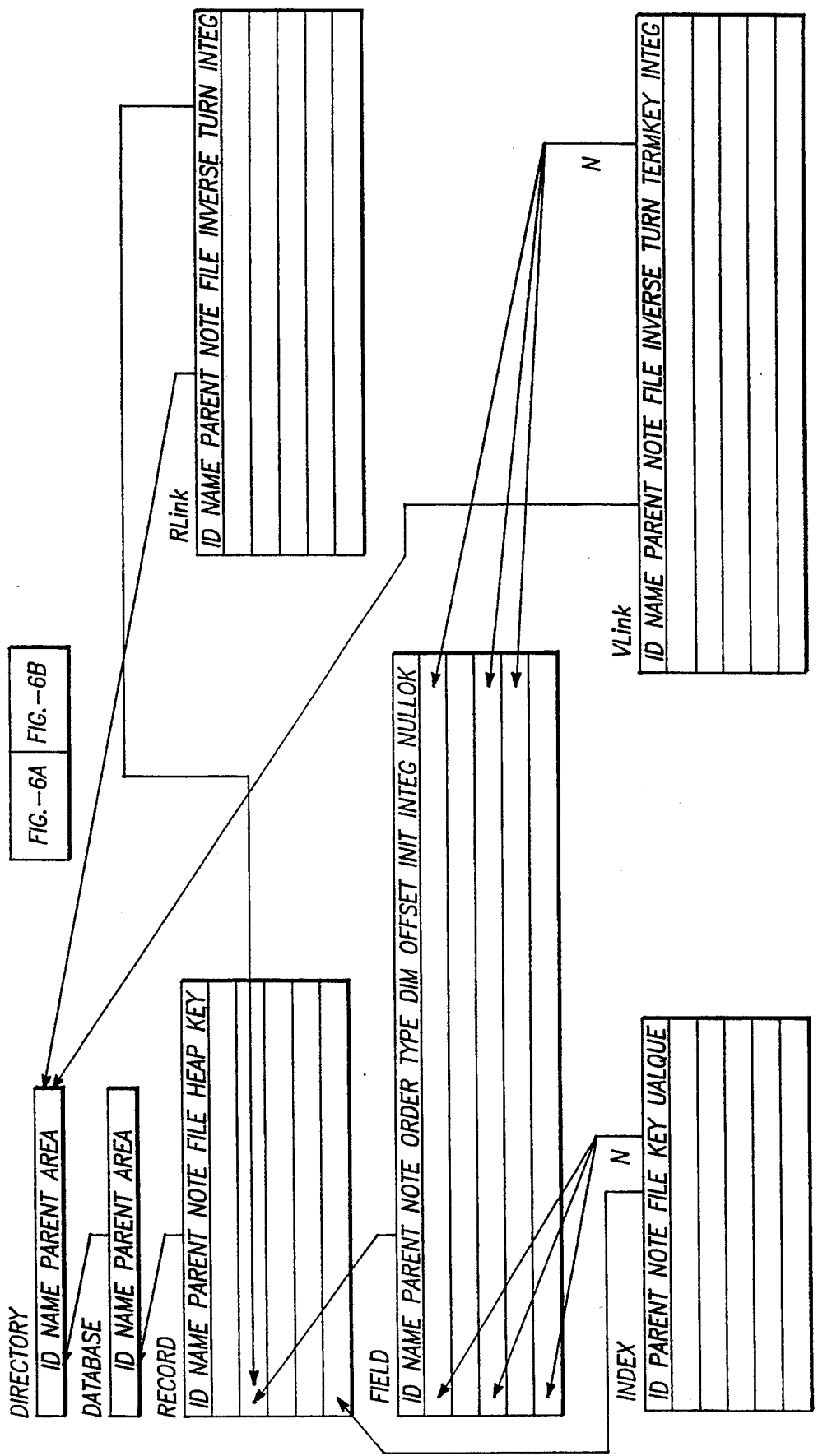
FIG. 6 illustratively represents the structure of a typical database dictionary.
Figure 6B:
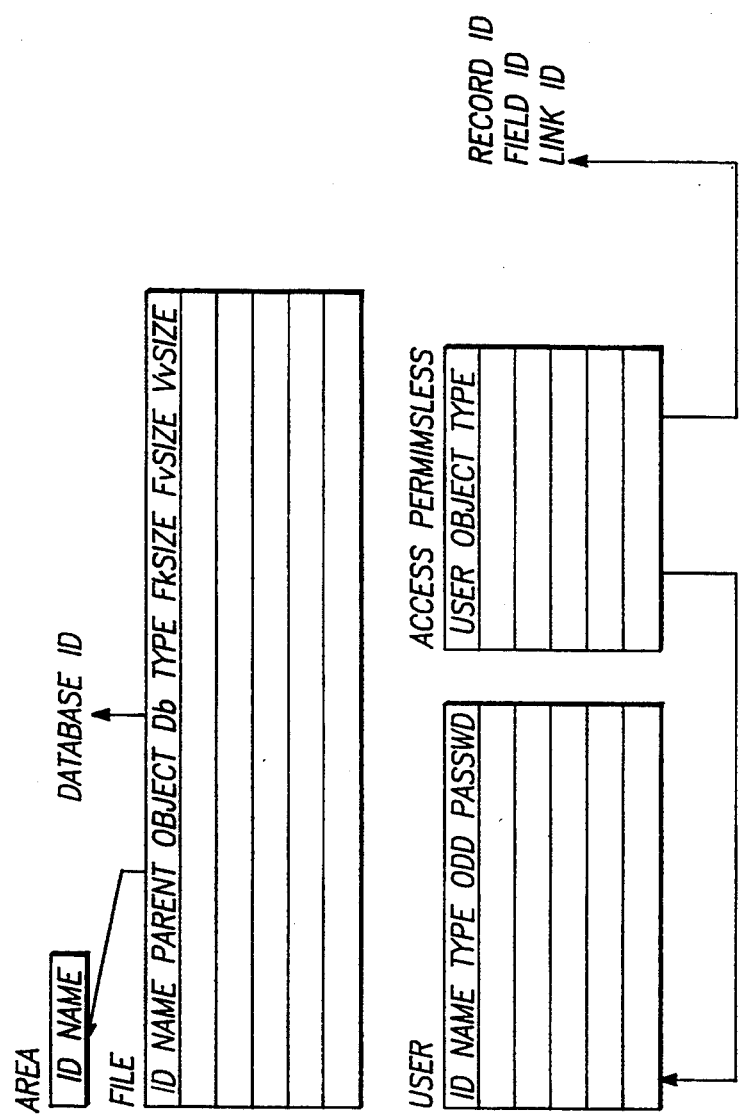

There exists a unique menu BDF for each database structure specified using the interface specification tool 129. Similarly, the number of data and relationship BDFs associated with a specified database corresponds to the number of entities and relationships represented in the database schema generated using the specification tool 129. Since the interpreter module relies on information within the dictionary of the parent database (e.g., FIG. 2) in order to create the block description files 130 corresponding to the database selected using the specification tool 129 (e.g., FIG. 3), the manner in which the BDFs are synthesized may be more readily explained by making reference to the structure of such a database dictionary. Accordingly, FIG. 6 illustratively represents the structure of a typical database dictionary. An explanation of each of the records included within the dictionary of FIG. 6 is set forth below:

| Directory |
| --- |
| One record is created for each directory. |

-continued

| | |
|---|---|
| Id | Directory number |
| Name | Directory name |
| Parent | Parent directory number |
| Area | Default value for the area number of the UNIX directory under which files related to the database are created. |
| Primary key | (Id) |
| Secondary key | (Parent, Name) |

Database
One record is created for each database.

| | |
|---|---|
| Id | Database number |
| Name | Database name |
| Parent | Parent directory number |
| Note | Comments |
| Area | Default value for area in which files related to this database are created. |
| Primary key | (Id) |
| Secondary key | (Parent, Name) |

Record
One record is created for each record type.

| | |
|---|---|
| Id | Record type number |
| Name | Record type name |
| Parent | Database number |
| Note | Comments |
| File | Record file number |
| Heap | Heap file number |
| Key | Array of field numbers comprising primary key |
| Primary key | (Id) |
| Secondary key | (Parent, Name) |

Field
One record is created for each field.

| | |
|---|---|
| Id | Field number |
| Name | Field name |
| Parent | Record type number |
| Note | Comments |
| Order | The logical field number within the record |
| Type | Encoded data type |
| Dim | Number of elements in array |
| Offset | Field position within record |
| Init | Test representation of initial value |
| Integ | Integrity information |
| NullOk | Allows or disallows null values. |
| Primary key | (Id) |
| Secondary keys | (Parent, Name) |
| | (Parent, offset) |

Index
One record is created for each index.

| | |
|---|---|
| Id | Index number |
| Parent | Record type number |
| Note | Comments |
| File | Index file number |
| Key | Array of field numbers comprising keys |
| Unique | Allows or disallows duplicates. |
| Primary key | (Id) |
| Secondary keys | (Parent) |
| | (Key) |

RLink
One record is created for each real-link type.

| | |
|---|---|
| Id | Real-link type number |
| Name | Link name (null value for unnamed inverse link types) |
| Parent | Database number |
| Note | Comments |
| File | Real-link file number |
| Inverse | Inverse link type number |
| Term | Terminal record type number |
| Intog | Integrity information |
| Primary key | (Id) |
| Secondary keys | (Parent, Name) |
| | (Term) |
| | (Inverse) |

VLink
One record is created for each virtual-link type.

| | |
|---|---|
| Id | Virtual-link type number |
| Name | Link name (null value for unnamed inverse link types) |
| Parent | Database number |
| Note | Comments |
| Inverse | Inverse link type number |
| Term | Terminal record type number |
| Termkey | Array of field numbers comprising key of terminal table |
| Integ | Integrity information |
| Primary key | (Id) |
| Secondary keys | (Parent, Name) |
| | (Term) |
| | (Inverse) |

Area
One record is created for each area in which files are created.

| | |
|---|---|
| Id | Area number |
| Name | Absolute pathname within UNIX filesystem |
| Primary key | (Id) |
| Secondary key | (Name) |

File
One record is created for each file.

| | |
|---|---|
| Id | File number |
| Name | Logical name of file (does not match UNIX file name) |
| Parent | ID number of the area in which file is stored |
| Object | ID number of the record type, index or real-link type this file defines |
| Db | Database number |
| Type | Classification as sequential file or B-tree, and as fixed length or variable length |
| FkSize | Number of bytes in fixed-length key section |
| VkSize | Number of bytes in variable-length key section |
| FvSize | Number of bytes in fixed-length data section |
| Vvsize | Number of bytes in variable-length data section |
| Primary key | (Id) |
| Secondary keys | (Parent) |
| | (Db) |

User
One record is created for each user.

| | |
|---|---|
| Id | User number |
| Name | User name |
| Type | Classification as UNIX user, UNIX group member or as user administered solely by GraphBase using password |
| Osid | UNIX user number of group number |
| Passwd | Encoded password |
| Primary key | (Id) |
| Secondary keys | (Type, Name) |
| | (Type, Osid) |

Access Permissions
One record is created for each permission granted.

| | |
|---|---|
| User | User number |
| Object | Access object number |
| Type | Type of access indicated using bit pattern |
| Primary key | (User, Object) |
| Secondary key | (Object, user) |

Statistics
One record is created for each access object.

| | |
|---|---|
| Object | Access object number |
| Ctime | Date and time that data definition was first made for access object. |
| Mtime | Date and time that data definition was last made for access object. |
| Acount | Array containing number of times processing was carried out for each access type. |
| Primary key | (Object) |

The database dictionary of FIG. 6 includes the following virtual links between the indicated records to facilitate queries made by the interpreter module during generation of the block description files 130:

DirectoryDirectory Sub-directories belonging to directory

DirectoryDatabase Sub-databases belonging to directory

DatabaseRecord Record types belonging to database

RecordField Record fields belonging to record type

RecordIndex Indexes belonging to record type

DatabaseRLink Real link types belonging to database

DatabaseVLink Virtual link types belonging to database

RecordRLink Real links connected to record type

RecordVLink Virtual links connected to record type

RLinkRLink Inverse link type corresponding to real-link type

VLinkVLink Inverse link type corresponding to virtual-link type

RecordFile Record file corresponding to record type

IndexFile Index file corresponding to index

RLinkFile Link file corresponding to real-link type

AreaFile Files belonging to file area

UserAccessRight Access rights belonging to user

DirectoryAccessRight Access rights to directory

DatabaseAccessRight Access rights to database

RecordAccessRight Access rights to record type

FieldAccessRight Access rights to field

RLinkAccessRight Access rights to real-link type

DirectoryStatistics Statistical information pertaining to directory

DatabaseStatistics Statistical information pertaining to database

RecordStatistics Statistical information pertaining to record type

FieldStatistics Statistical information pertaining to field

IndexStatistics Statistical information pertaining to index

RLinkStatistics Statistical information pertaining to real-link type

VLinkStatistics Statistical information pertaining to virtual-link type

AreaStatistics Statistical information pertaining to file area

FileStatistics Statistical information pertaining to file

UserStatistics Statistical information pertaining to users.

The interpreter module creates the menu, data and relationship block description files 130 by retrieving certain information from the database dictionary. The following pseudocode routines are representative of a particular manner in which the block description files 130 may be synthesized:

---

Menu BDF Generation

For each <op> in the Operations Table (FIG. 5)
  if <selected?>='y'
    output <op_name>

Data BDF Generation

For each <entity> in the Entity List (FIG. 4)
  output <entity>, label
  for each <attribute> in the Attribute List of <entity>
    1) retrieve <type> <dim> from the Field table in the Data Dictionary
    2) output <attribute> label <type> <dim>

Relationship BDF Generation

For each <relationship> in the Relationship List

---

-continued output <relationship>, label
  output <relationship>, entity_x
  output <relationship>, entity_y
  output <relationship>, Cardinality

Methodology of Interface Generation

Figure 7:
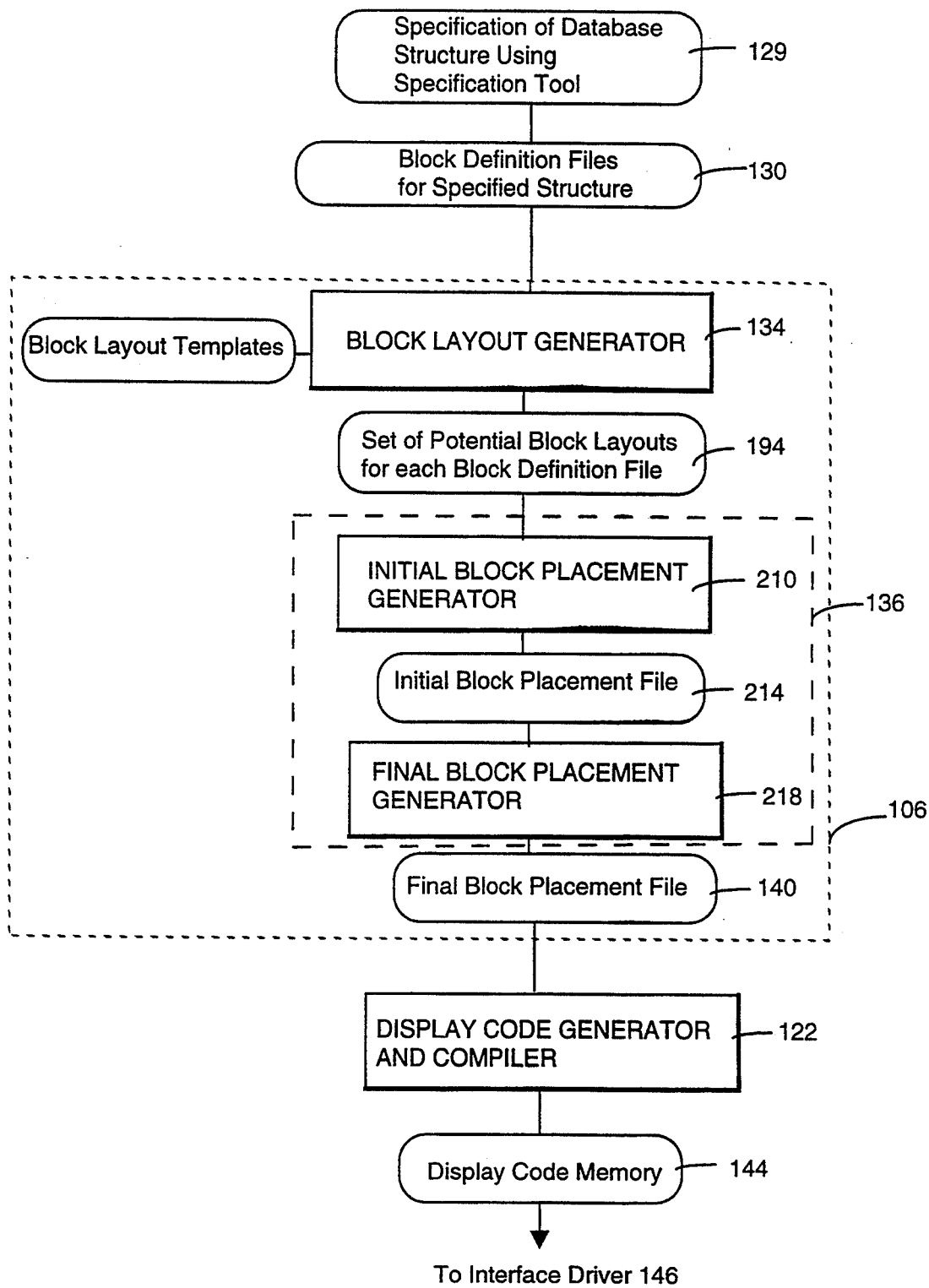
FIG. 7 shows a functional block diagram representative of a preferred manner of generating an interface layout in accordance with the present invention.

Referring to FIG. 7, there is shown a functional block diagram representative of a preferred manner of generating an interface layout in accordance with the present invention. As shown in FIG. 7, a set of block description files 130 are generated by the interpreter module in accordance with a data structure defined by the specification tool 129. A set of interface object blocks for each block description file 130 are then created by the block layout generator 134 by varying the arrangement, spacing and graphical representation of data fields included within the object blocks. Each data field is defined by a segment of graphics software hereinafter denoted as a widget.

Each interface object block has associated therewith a "quality" parameter based on predefined block configuration guidelines and constraints related to the selection and location of widgets within the object block. Guidelines are formulas which yield various scores used in computing the quality parameter, while constraints describe conditions which must be satisfied if a particular design is to be considered acceptable. Typical constraints include "two fields may not overlap", "the width and height must not exceed the space allocated", and "the number of fields within the object block must be less than N".

Figure 8:
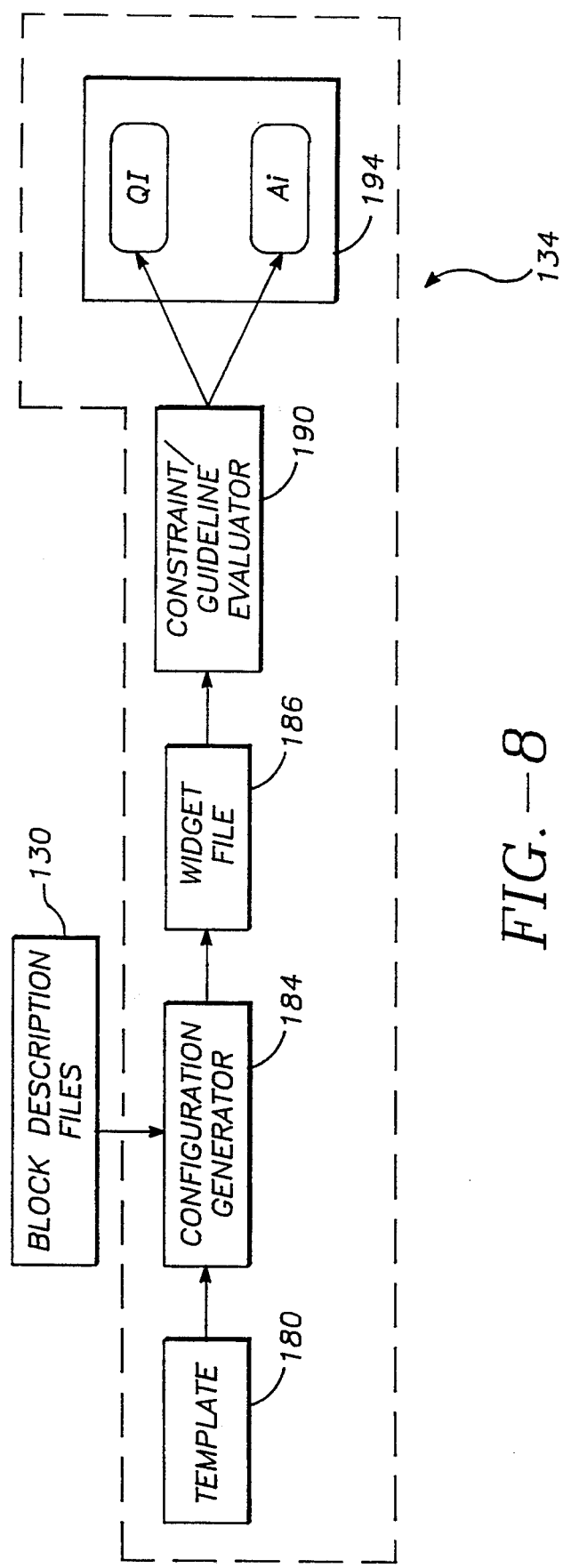
FIG. 8 is a block diagrammatic representation of the components comprising a block layout generator included within the present invention.

FIG. 8 is a block diagrammatic representation of the components comprising the block layout generator 134. The layout generator 134 operates to create the set of interface object blocks corresponding to each block description file 130 based on information included within a corresponding set of templates 180. Each template 180 is a data structure which includes information enabling the generation of multiple interface object blocks. More specifically, each template 180 includes a Representation Section which assigns each data field within the object block to a particular widget class (e.g., Text, ScrolledText, Scale, Button). Attributes associated with each widget class (e.g., font size, dimensions, color) are defined within a Local Attributes Section. The Local Attributes Section also includes information relating to the size of the margins between the perimeter of the object block and the data fields, the spacing between data fields, and the like. The placement of data fields within each object block is performed in accordance with a Layout Plan stored within each template 180. For example, the Layout Plan included within a particular template 180 may specify that the data fields within a first object block associated with the template be arranged in a single column, that the data fields be arranged in two columns in a second object block, that the data fields be arranged in three columns in a third object block, and so on. In a preferred implementation each of the templates 180 will be structured as follows:

```
/* Representation section */
<obj_1>            <widget_type>
<obj_2>            <widget_type>
<obj_N>            <widget_type>
```

```
/* Local attributes */
FontSize = #;
FontStyle = [P,B,I];                /* P=plain, B=bold,
                                       I=italic */
UperMargin = ##;                    /* separation between the
                                       upper border and topmost
                                       widget */
LowerMargin = ##;                   /* separation between the
                                       lower border and the
                                       lowermost widget */
LeftMargin = ##;                    /* separation between the
                                       left border and the
                                       lowermost widget */
RightMargin = ##;                   /* separation between the
                                       right border and the
                                       rightmost widget */
FieldSeparation = ##;               /* distance between
                                       fields */
FieldLabelSeparation = ##;          /* distance between a
                                       field and its label */
ColumnSeparation = ##;              /* distance between
                                       columns */
/* Layout plan */
<function>
```

Each template 180 is defined in a separate file. As is described more fully below, the template files are read and interpreted by a configuration generator 184 (FIG. 8). With the exception of the Layout Plan, the values of each parameter within a template file can be independently modified. In a preferred embodiment each Layout Plan will be written in C-code, then compiled and linked into software included within the configuration generator 184. A set of Layout Plans included within preferred implementations of the templates 180 are set forth below:

```
          FieldLabelSeparation = ##;   /* distance between a
                                          field and its label */

ColumnSeparation = ##;       /* distance between
                                          columns */

/* Layout plan */
          <function>
```

Each template 180 is defined in a separate file. As is described more fully below, the template files are read and interpreted by a configuration generator 184 (Figure 8). With the exception of the Layout Plan, the values of each parameter within a template file can be independently modified. In a preferred embodiment each Layout Plan will be written in C-code, then compiled and linked into software included within the configuration generator 184. A set of Layout Plans included within preferred implementations of the templates 180 are set forth below:

DEFINITIONS
Variables:

```
N              : Number of widgets to be layed out:
W[i]           : i-th widget
W[i].width     : Widget.width
W[i].height    : Widget.height
W[i].x_pos     : x-coordinate of the widget position (with respect to
the block)
```

W[i].y_pos : y-coordinate of the widget position (with respect to the block)

Constants:

The following constants are defined in the local attribute section of the template:

InterButtonWidth
InterButtonHeight
LeftMargin
RightMargin
UpperMargin
LowerMargin
HorizontalFieldSeparation
VerticalFieldLabelSeparation Layout Plan #1: HorizontalMenu()

/*Menu buttons of identical height are arranged in a single row*/
================================
```
    curr_x=0;
    for(i=1;i<=N;i++) {
                                        W[i].x_pos = curr_x;
                                        W[i].y_pos = 0;
                                        curr_x = curr_x + W[i].width +
menuInterButtonWidth;
    }
```

Layout Plan #2: VerticalMenu()
/*Menu buttons of identical width are arranged in a single column*/
==============================
```
    curr_y = 0;
    for(i=1;i<=N;i++) {
                                        W[i].x_pos = 0;
                                        W[i].y_pos = curr_y;
                                        curr_y = curr_y + W[i].height
+ InterButtonHeight;
    }
```

Layout Plan #3: ColumnSplit(columns)
/* menu buttons are divided into N columns */
====================================================

```
            total_height = sum(W[i].height);
            curr_x = 0;
            curr_y = 0;
            first = 1;
            for(i=1;i<=columns;i++) {
                column_height =
  total_height/(columns-i+1);

residual = total_height -
  (columns-i+1)*column_height;

if(residual>0) {
                    column_height++;
                }
                h = 0;
                last = first;
                while(h<=column_height &&
  last<=N) {
                    h = W[last].height;
                    k = h;
                    if(last!=first &&
  (h-column_height)>W[last].height/2)
                        k = k-W[last].height;
                    else
                        last++;
                }
                last = last - 1;
                total_height = total_heigh -
  k;
                widest = max{W[i] |
  first<=i<=last};

for(j=first;j<=last;j++) {
                    W[j].x_pos = curr_x;
                    W[j].y_pos = curr_y;
                    curr_y =
  curr_y+W[j].height+InterButtonHeight;
                } curr_y=0;
                curr_x =
  curr_x+widest+InterButtonWidth;
                first=last+1;
            }

Layout Plan #4: PackedHorizontalTextFieldSet(max_width)
/*Fields are sequentially arranged row by row.  A new row is
``` initiated when the cumulative width of the fields, associated labels, block margins, and inter-field spacing exceeds a predefined row width denoted by max_width*/
===================================================

```
    curr_x=0;
    curr_y=0;
    max_h=0;
    for(i=1;i<=N;i++) {
        if(curr_x+W[i].width > width-LeftMargin) {
            curr_y = curr_y + max_h + VerticalFieldSeparation;
            curr_x = 0;
            max_h  = 0;
        }
        W[i].x_pos = curr_x;
        W[i].y_pos = curr_y;
        curr_x = curr_x + W[i].width + HorizontalFieldSeparation;
        max_h = max(max_h,W[i].height);
    }
```

Layout Plan #5: ColumnSplit(columns)
/*This routine partitions the data fields of an object block into N columns*/
===================================================

```
    total_height=sum(W[i].height);
    curr_x=0;
    curr_y=0;
    first=1;
    for(i=1;i<=columns;i++) {
        column_height=total_height/(columns-i+1);
        residual=total_height - (columns-1+1)*column_height;
        if(residual>0) {
            column_height++;
        }
        h=0;
        last=first;
        while(h<=column_height && last<=N) {
            h+=W[last].height;
            k=h;
```

```
(h-column_height)>W[last].height/2)
                                    if(last!=first &&
                                            k-=W[last].height;
                                    else
                                            last++;
                            }
                            last = last-1;
                            total_height=total_height-k;
                            widest = max{W[i] |
first<=i<=last};

for(j=first;j<=last;j++) {
                                    W[j].x_pos = curr_x;
                                    W[j].y_pos = curr_y;
                                    curr_y =
curr_y+W[j].height+VerticalFieldSeparation;
                            } curr_y=0;

curr_x=curr_x+widest+HorizontalFieldSeparation;
                            first=last+1;
    }
```

Figure 9A shows an example of a template 180 which, together with a block description file 130, are utilized by the layout generator 134 to produce a set of three object blocks (Figures 9B-9D). In the example of Figure 9A, the Layout Plan denoted as 'column_split ({1,2,3})' includes instructions specifying that each of the data fields (e.g., Name, Age, Street, ...) within the object block of Figure 9B be configured in a single column, and that the data fields within Figures 9B and 9C be arranged in a pair of columns, and in multiple columns, respectively.

As is indicated by Figure 8, the configuration generator 184 utilizes the set of available templates 180 in order to create the set of object blocks associated with a particular block description file 130. In a FIG. 9A shows an example of a template 180 which, together with a block description file 130, are utilized by the layout generator 134 to produce a set of three object blocks (FIGS. 9B-9D). In the example of FIG. 9A, the Layout Plan denoted as 'column_split ({1,2,3})' includes instructions specifying that each of the data fields (e.g., Name, Age, Street, . . . ) within the object block of FIG. 9B be configured in a single column, and that the data fields within FIGS. 9B and 9C be arranged in a pair of columns, and in multiple columns, respectively.

As is indicated by FIG. 8, the configuration generator 184 utilizes the set of available templates 180 in order to create the set of object blocks associated with a particular block description file 130. In a preferred embodiment the configuration generator 184 operates to create several object blocks for each template 180 in accordance with the associated Layout Plan. Information relating to the set of object blocks corresponding to each of the block description files 130 is stored within a widget file 186. The widget file 186 specifies the location and type, i.e., widget type, of the data included within the object blocks defined by the widget file 186. The configuration generator 184 appends to the widget file 186 the object block information generated in response to the processing of each block description file 130. The following pseudocode routine is representative of a preferred manner in which the set of object blocks corresponding to one of the block description files (BDFs) 130 are generated by the configuration generator 184:

For each BDF
        For each template
            For each field
                Generate a widget description using the information provided in the Representation Section of the template and the characteristics of the field included within the Data Dictionary. For example, the "Name" field within the template of FIG. 9A is assigned the widget TextField(N), where TextField is the type of widget associated with the descriptor "Text" and the value N is the length of the field defined in the Data Dictionary.
        Call the layout routine specified in the
        Layout Plan section of the template.
The format of the widget file 186 is as follows:

```
<block_description_1>
    <widget_description_11>
    <widget_description_12>
    ...
    <widget_description_1M_1>
<block_description_2>
    <widget_description_21>
    <widget_description_22>
    ...
    <widget_description_2N_2>
<block_description_N>
    <widget_description_N1>
    <widget_description_N2>
    ...
    <widget_description_NM_N>
``` where <block_descriptor_X> denotes the Xth object block defined by the widget file 186, and where <widget_description_K> refers to the Kth data field within a given object block. Each <block_descriptor_X> is of the form:

```
<internal_name>  <configuration_id>
<number_of_widgets>
```

The format of <widget_description_K> depends on the type of widget used to represent the associated data field. For example, the widget type defining a data field represented as a menu button is of the following format:

```
<t_up>  <t_down>  <t_left>  <t_right>  <b_up>
    <b_down>  <b_left>
    <b_right>  <label>
``` where {<t_up> <t_down>} determine the position of upper and lower horizontal lines and <t_left> <t_right>} specify the position of left and right vertical lines which define the smallest rectangle capable of surrounding the label of the menu button icon. Similarly, {<b_up> <b_down> <b_left> <b_right>} define the rectangular button icon itself. The character string within <label> corresponds to the label identifying the button icon, e.g. INSERT.

The following listing corresponds to a portion of a widget file 186 defining the object blocks (i.e., Menu, PREVIOUS TEAMS and PLAYER) depicted in FIG. 10.

| M*DESCR/MENU | | 0000 | 3 | | | | | |
|---|---|---|---|---|---|---|---|---|
| 00012 | 00048 | 00012 | 00124 | 00008 | 00052 | 00008 | 00128 | Retrieve |
| 00068 | 00104 | 00026 | 00110 | 00064 | 00108 | 00008 | 00128 | Update |
| 00124 | 00160 | 00040 | 00096 | 00120 | 00164 | 00008 | 00128 | Exit |
| T*DESCR/XXX01 | | 0000 | 4 | | | | | |
| 0052 | 0082 | 0002 | 0079 | 0052 | 0082 | 0083 | 0303 | 02*Name |
| 0084 | 0114 | 0002 | 0079 | 0084 | 0114 | 0083 | 0127 | 02*From |
| 0116 | 0146 | 0002 | 0079 | 0116 | 0146 | 0083 | 0127 | 02*To |
| 0148 | 0178 | 0002 | 0079 | 0148 | 0178 | 0083 | 0138 | 02*Average |
| T*DESCR/XXX02 | | 0000 | 7 | | | | | |
| 0052 | 0082 | 0002 | 0090 | 0052 | 0082 | 0094 | 0314 | 02*Name |
| 0084 | 0114 | 0002 | 0090 | 0084 | 0114 | 0094 | 0149 | 02*Age |
| 0116 | 0146 | 0002 | 0090 | 0116 | 0146 | 0094 | 0314 | 02*Street |
| 0148 | 0178 | 0002 | 0090 | 0148 | 0178 | 0094 | 0259 | 02*City |
| 0180 | 0210 | 0002 | 0090 | 0180 | 0210 | 0094 | 0193 | 02*Zip |
| 0212 | 0242 | 0002 | 0090 | 0212 | 0242 | 0094 | 0105 | 02*Photo |
| 0244 | 0274 | 0002 | 0090 | 0244 | 0370 | 0094 | 0369 | |

02*Comments

The values in the widget file 186 are utilized by a constraint and guideline evaluator 190 to determine the value of a quality parameter indicative of the extent to which the arrangement of fields within a particular block comports with predefined guidelines and constraints. Included within a preferred set of guidelines upon which this quality evaluation is based are:

(1) wasted space (WS),
  where WS=$\Sigma$ widget_area(i)/block area where block area corresponds to the area of the minimum rectangle capable of enclosing each of the data fields within the object block while maintaining a specified margin offset between each data field and the border of the minimum enclosing rectangle.

(2) balance (B) of the fields within the object block, where B is computed by (i) dividing the block area into four quadrants, and (ii) comparing the area covered by the fields in each quadrant with the expected field coverage in a perfectly balanced layout, i.e. $\Sigma$ widget-area(i)/4.

(3) cursor movement (C), where C corresponds to the sum of the distance, i.e., number of display pixels, between the last position of field Fi and the first position of field Fi+1.

Each guideline will preferably be implemented using object-oriented code (e.g., C++), and may be defined as a function of the form:

---
score function (block_descriptor, {widget_descriptors}).
---

A set of constraints preferably used by the evaluator 190 include:

(1) Fields cannot overlap,
(2) the width of the block cannot exceed W, and
(3) the height of the block cannot exceed H, where W and H are constants determined by the dimensions of the display area of display unit 128.

Constraints may also be defined in terms of functions. However, constraint functions are formulated to return a value of zero if the constraint is satisfied and a value of K if the constraint is violated. K may be chosen to be arbitrarily large in order to guarantee that object block violating the constraint will not be considered during the block placement procedure described below.

The quality (QI) of the Ith object block evaluated by the guideline and constraint evaluator 190 is determined in accordance with the following weighted sum:

$$QI = \Sigma Sg(i)W(i) + Sc(i)$$

where Sg(i) corresponds to the score of the ith guideline, Sc(i) corresponds to the score of the ith constraint, and $\Sigma$ W(i)=1. The value of QI is inversely proportional to the degree to which the layout of an object block agrees with the set of guidelines and constraints. In addition, the values of the weighting coefficients W(i) are selected on the basis of the relative importance of each guideline to a desirable data field arrangement.

The constraint and guideline evaluator 190 also determines values of global attributes (Ai) for each object block (e.g., width, height, font_size, color). The values of Ai, together with the values of the associated quality parameters QI, are placed in a block file 194 organized as follows:

---
<block_1>  <attr_1> <attr_2> <attr_3>...
    <attr_N> <QI>
---

Referring again to FIG. 7, the block placement routine 136 includes an initial block placement generator 210 for arranging a set of object blocks in an initial configuration. Each block description file 130 is represented by a single object block within the set of object blocks selected by the initial placement generator 210, which are stored within an initial block placement file 214. As is described below, during the block placement process other object blocks representative of a particular description file 130 may be substituted for the block initially chosen by the initial placement generator 210. Such substitutions will be made in accordance with a placement procedure effected by the final block placement generator 218 (FIG. 7), which is designed to optimize the final placement of blocks within the interface.

The final block placement generator 218 operates to arrange a set of object blocks into an interface layout in accordance with an iterative improvement heuristic known as simulated annealing (see, e.g., S. Kirkpatrick, C. D. Gelatt and M. P. Vecchi, "Optimization by Simulated Annealing," Science, Vol. 20, No. 4598, May 1983, pp. 671–680). The simulated annealing procedure is based on the use of a probability function to randomly move through a solution space. In the present instance, the solution space corresponds to every potential arrangement within the database interface of a set of object blocks corresponding to the specified set of block description files 130. Subsequent to each iteration the "quality" of the solution is compared with that corresponding to the solution obtained during the previous iteration. In general, a new solution is accepted only if it represents an improvement over a prior solution. However, in order to avoid being constrained to the solution space proximate a local minimum the simulation annealing function accepts certain inferior solutions. The following pseudo-code is descriptive of the simulated annealing procedure:

---
Simulated Annealing
    Initialize;
    placement = GenerateInitialPlacement;
    cost = Evaluate(placement);
    while(loop_count<MAX_ITERATIONS and temperature > MIN_TEMPERATURE)
        new_placement = Perturb(placement)
        new_cost=Evaluate(new_placement);
        if (Accept(new_placement, new_cost, temperature))
            placement=new_placement;
            cost=new_cost;
        loop_count++;
        temperature=NewTemperature(loop_count);
    return(placement, cost);
---

Referring to FIGS. 11A–C, in a preferred embodiment a slicing tree data structure is used to represent the block placements manipulated by the initial and final block placement generators 210 and 218. In particular, the leaves of the slicing tree structure of FIG. 11A represent the object blocks included within the block placement (configuration) of FIG. 11B. The interior nodes of the slicing tree are indicative of horizontal and vertical cuts which separate the interface layout into a configuration of adjacent rectangles. Information stored in memory locations corresponding to each leaf node includes the geometry and size of the corresponding object block, as well as a justification code describing the position of the object block within the rectangle formed by the surrounding cuts. FIG. 11C shows one set of acceptable justifications of an object block relative to the rectangle defined by the surrounding cuts. In a preferred implementation the following convention is used to interpret the left and right children of a horizontal (H) node: the left child of a horizontal node is always located above the right child. Similarly, the left child of a vertical (V) node is always to the left of the right child.

Figure 12B:
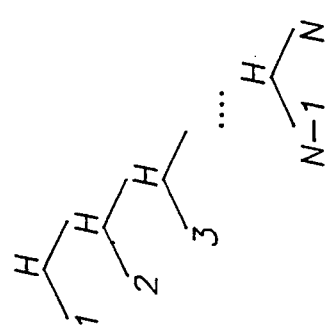
FIG. 12A shows an initial block placement corresponding to the sliced tree representation of the initial placement depicted in FIG. 12B.
Figure 12A:
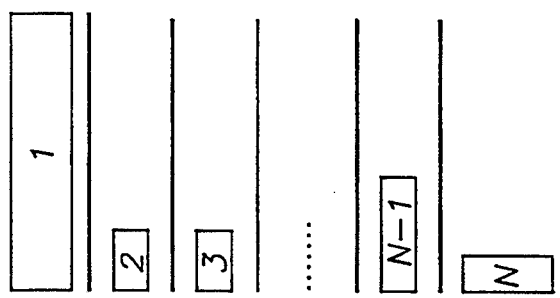

The initial placement generator 210 will preferably be implemented so as to execute the GenerateInitialPlacement function in a manner resulting in the initial object block placement depicted in FIGS. 12A and 12B. In the arrangement of FIG. 12A there is included in the interface one object block corresponding to each of N block description files 130. The N object blocks are arranged in a vertical stack, with the corresponding sliced tree data representation being depicted in FIG. 12B.

As is indicated by the pseudo-code description of the simulated annealing procedure given above, a perturbation step is performed prior to the evaluation conducted during each iteration. The purpose of this perturbation step is to produce a variation of the current placement by applying operations to alter its structure. The Perturb function for implementing this step is structured as follows:

```
Perturb(placement)
    OP=SelectOperation;
    if (BlockCount(OP)=1
        B1=SelectBlock;
        OP(B1);
    else
        B1=SelectBlock;
        B2=SelectBlock;
        OP(B1,B2);
``` where B1 and B2 are object blocks included within a current configuration of object blocks within the interface. SelectOperation and SelectBlock are random functions (using a uniform probability distribution), while BlockCount is a function that determines the number of object blocks affected by the one of the following OP operations:

| | |
|---|---|
| Replace(b) | substitutes a second object block for object block b. |
| Swap(b1,b2) | interchanges the position of two blocks b1 and b2, |
| Move(b1,b2) | places a block b1 next to block b2 |

FIGS. 13A and 13B depict changes occurring to a block configuration as a consequence of execution of the Replace operation. Similarly, FIGS. 14A-B and 15A-B depict the effects of the Swap and Move operations. The following sequence of steps may clarify the manner in which the Move operation is implemented:
1. Remove b1 and its parent from the tree.
2. Connect b1's sibling to its grand parent.
3. Disconnect b2 from the tree and connect it to b1's parent.
4. Reconnect b1's parent to the tree at the location where b2 was removed.

The final block placement generator 218 implements the simulated annealing procedure by computing a cost evaluation function C(i), where C(i) corresponds to the "cost" of the block configuration existing after the ith perturbation operation. Four cost components are considered when determining the value of the cost evaluation function Evaluate:

$C1 = \Sigma(BQ(i)/N)$ where $BQ(i)$ is the quality score assigned to the ith of N object blocks included within the current configuration (placement) of object blocks within the interface;

$C2$=Placement Wasted Space (PWS), where PWS is a recursive function that traverses the placement tree in order to determine the difference between the size of each block and its allotted area.

$C3 = V$ if a placement constraint is violated and zero otherwise, where V is selected to be large enough to guarantee that the current placement will not be accepted.

$C4 = \Sigma(G(i)/M)$, where $G(i)$ is the guideline score associated with the ith object block configuration, and M is the number of placement guidelines.

These factors are then combined by the final block placement generator 218 in the following manner in order to determine the cost Ci of the block configuration existing after the ith iteration of the simulated annealing procedure:

$$C = C1W1 + C2W2 + C3W3 + C4W4$$

where $\Sigma Wi = 1$. The cost Ci is the value returned by the function Evaluate.

In a preferred implementation of the simulated annealing procedure outlined above block configurations resulting in a cost reduction are always accepted. In addition, block configurations which result in cost increases are accepted with a probability that decreases over time. This aspect of the annealing procedure may be described by an acceptance function (Ac) of the form:

$$Ac = e^{-\Delta C/Ti}$$

where $\Delta C$ is the difference in cost between the previous and current block configurations, and Ti corresponds to a "temperature" of the ith iteration. The temperature function is defined as:

$$Ti+1 = \alpha(T) * Ti$$

where $\alpha(T)$ is a function that returns a real value in the range (0,1) when called. In a preferred embodiment the function $\alpha(T)$ is a step function of the type typically utilized in applications involving the simulated annealing procedure.

As is indicated by the pseudo-code representation of the simulated annealing procedure set forth above, the block placement generator 218 produces a final block configuration after either:
(i) a predefined number (MAX_ITERATIONS) of iterations have been executed, or
(ii) the temperature Ti becomes less than the temperature MIN_TEMPERATURE.

The final block configuration is then stored within the final block placement file 140.

Figure 16:
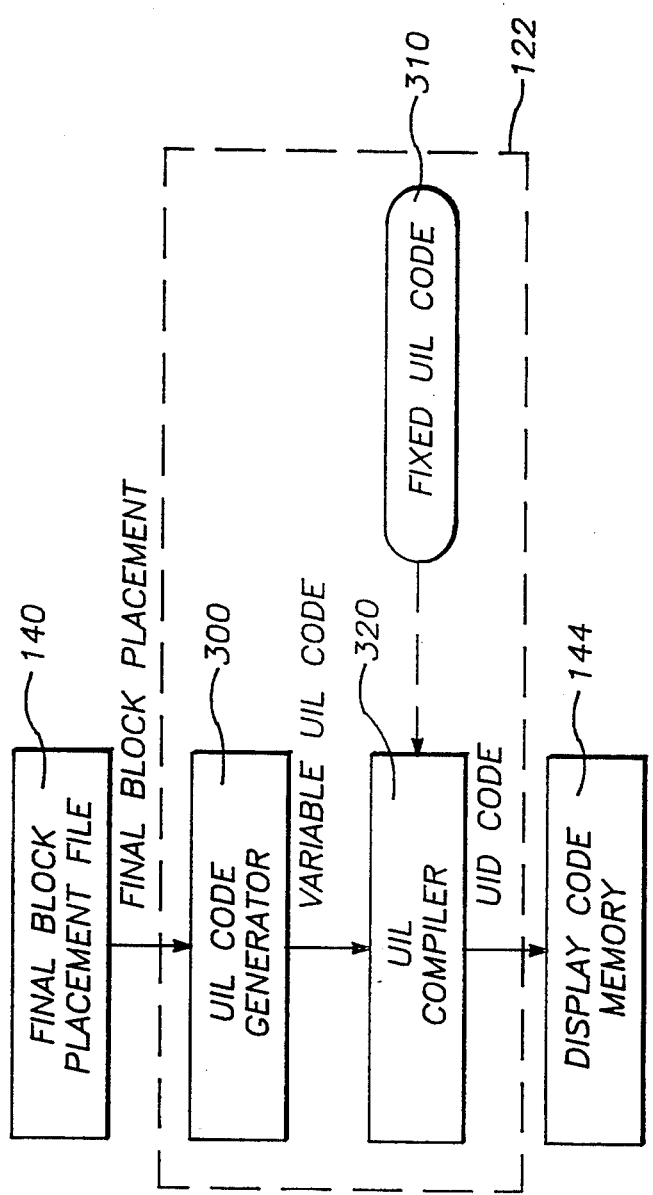
FIG. 16 shows a block diagrammatic representation of a particular implementation of a display code generator and compiler.

Referring to FIG. 16, there is shown a block diagrammatic representation of a particular implementation of the display code generator and compiler 122. Although the implementation of FIG. 16 is described with reference to the User Interface Language (UIL) developed by the Open Software Foundation, Inc., it is understood that in alternative embodiments other user interface languages may be utilized. A UIL code generator 300 produces UIL code on the basis of the final block configuration stored within the final block placement file 140. This UIL code describes characteristics of GUI widgets selected as on-screen representations of the interface objects. Such GUI widgets may be selected from among those included within, for example, the OSF/Motif user environment developed by the Open Software Foundation, Inc. The UIL code is merged with a series of application-independent UIL statements, denoted as fixed UIL code 310, which results in a complete UIL program. This UIL program is then processed by a UIL compiler 320 so as to yield UID code stored in display code memory 144. This display code is used by the interface driver 146 (FIG. 1) to generate the interface layouts displayed by the display unit 128.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. An automatic interface layout generator for database systems comprising:
   means for specifying a set of block descriptions representative of specified portions of a database;
   means for providing interface objects to be included within an interface of said database wherein each of said interface objects corresponds to one of said block descriptions and includes a plurality of layout fields and each of said block descriptions has associated therewith a set of said interface objects, said set of interface objects associated with each of a plurality of said block descriptions including a plurality of interface objects having varying placements of said plurality of layout fields and/or varying layout field attributes that affect the size and shade of said plurality of interface objects such that said plurality of interface objects associated with each said block description have a plurality of distinct shapes;
   means for determining a layout quality parameter for each of said interface objects based on layout of said layout fields within said interface objects;
   block placement means for arranging sets of said interface objects into block configurations within said interface, said block placement means including means for placing, in a first of said block configurations, a first one of said plurality of interface objects associated with a first one of said block descriptions, and for placing, in a second of said block configurations, a second one of said plurality of interface objects associated with said first one of said block descriptions; and
   means for determining a placement quality parameter for each of said block configurations based on a set of block placement rules and on said layout quality parameters, including means for selecting a final block configuration by comparing said placement quality parameters.

2. The automatic interface layout generator of claim 1 wherein said block placement rules include guidelines relating to geometry of said block configurations.

3. The automatic interface layout generator of claim 2 wherein said block placement rules include constraints relating to geometry of said block configuration relative to geometry of said interface.

4. The automatic interface layout generator of claim 1 wherein said layout quality parameters are determined in accordance with layout guidelines relating to distribution of said layout fields within said interface objects.

5. The automatic interface generator of claim 4 wherein said layout guidelines include:
   a wasted space guideline corresponding to the ratio of area occupied by a first set of said layout fields included within one of said interface objects to area occupied by said one interface object, and
   a balance guideline related to uniformity of distribution of said first set of layout fields over predefined regions of said one interface object.

6. The automatic interface generator of claim 1 wherein each of said layout fields corresponds to one of a plurality of widget types, and wherein said means for generating a set of interface objects for each of said block descriptions includes means for assigning a widget type to each of said layout fields.

7. The automatic interface generator of claim 1 wherein said block placement means includes means for iteratively arranging sets of said interface objects into block configurations on the basis of a simulated annealing procedure in which a pair of said placement quality parameters corresponding to a pair of said block configurations generated during successive iterations of said annealing procedure are compared so as to determine which of said pair of placement quality parameters is utilized in a subsequent iteration of said annealing procedure.

8. The automatic interface generator of claim 7 further including means for perturbing said simulated annealing procedure in accordance with a perturbation function.

9. The automatic interface generator of claim 1 further including code generator means for generating code corresponding to a display representation of said final block configuration.

10. A method for automatically generating an interface layout for a database comprising the steps of:
    specifying a set of block descriptions representative of specified portions of said database;
    providing interface objects, based on said block descriptions, for inclusion within an interface of said database wherein each of said interface objects has a plurality of layout fields and each of said block descriptions has associated therewith a set of said interface objects, said step of providing interface objects including the step of varying placement of said layout fields at least among interface objects included within a first of said sets and/or varying layout field attributes that affect the size and shape of said interface objects in said first set such that said interface objects included within said first set are of a plurality of distinct shapes;
    determining a layout quality parameter for each of said interface objects based on layout of said layout fields within said interface objects;
    arranging first and second groups of said interface objects into first and second block configurations, respectively, within said interface wherein each of said groups includes an interface object from each of said sets of interface objects, said step of arranging including the step of placing a first one of said interface objects from said first set within a first of said block configurations and the step of placing a second one of said interface objects from said first set within a second of said block configurations; and determining first and second placement quality parameters for said first and second block configurations, respectively, based on a set of block placement rules and on said layout quality parameters, including means for selecting a final block configuration by comparing said first and second placement quality parameters.

11. The method of claim 10 wherein said step of determining said layout quality parameters includes the step of generating said layout quality parameters in accordance with layout guidelines relating to distribution of said layout fields within said interface objects.

12. The method of claim 11 wherein said step of generating said layout quality parameters includes the steps of:

determining a wasted space guideline corresponding to the ratio of area occupied by a first set of said layout fields included within one of said interface objects to area occupied by said one interface object, and determining a balance guideline related to uniformity of distribution of said first set of layout fields over predefined regions of said one interface object.

13. The method of claim 10 wherein each of said layout fields corresponds to one of a plurality of widget types, and wherein said step of generating a set of interface objects for each of said block descriptions includes the step of assigning a widget type to each of said layout fields.

* * * * *